United States Patent
Ueno et al.

(10) Patent No.: US 12,275,845 B2
(45) Date of Patent: Apr. 15, 2025

(54) DIENE RUBBER AND RUBBER COMPOSITION

(71) Applicant: KURARAY CO., LTD., Kurashiki (JP)

(72) Inventors: Yoshikazu Ueno, Kamisu (JP); Daisuke Koda, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 721 days.

(21) Appl. No.: 17/612,824

(22) PCT Filed: May 21, 2020

(86) PCT No.: PCT/JP2020/020051
§ 371 (c)(1),
(2) Date: Nov. 19, 2021

(87) PCT Pub. No.: WO2020/235619
PCT Pub. Date: Nov. 26, 2020

(65) Prior Publication Data
US 2022/0220286 A1  Jul. 14, 2022

(30) Foreign Application Priority Data
May 22, 2019 (JP) .................................. 2019-095781

(51) Int. Cl.
  *C08L 7/00* (2006.01)
  *B60C 1/00* (2006.01)
  *B60C 11/00* (2006.01)

(52) U.S. Cl.
  CPC .............. *C08L 7/00* (2013.01); *B60C 1/0016* (2013.01); *B60C 11/0008* (2013.01); *B60C 2001/0058* (2013.01); *B60C 2001/0066* (2013.01); *B60C 2011/0025* (2013.01)

(58) Field of Classification Search
  CPC ...................................................... C08L 9/00
  See application file for complete search history.

(56) References Cited

U.S. PATENT DOCUMENTS

| | | | | |
|---|---|---|---|---|
| 3,678,121 | A * | 7/1972 | McElroy | C08F 136/06 585/452 |
| 3,966,691 | A | 6/1976 | Halasa | |
| 4,104,465 | A | 8/1978 | Halasa | |
| 5,534,592 | A | 7/1996 | Halasa et al. | |
| 5,550,200 | A | 8/1996 | Shibata et al. | |
| 5,916,962 | A | 6/1999 | Shibata et al. | |
| 7,470,743 | B2 | 12/2008 | Cabioch et al. | |
| 7,470,760 | B2 * | 12/2008 | Cabioch | C08F 36/04 502/154 |
| 2006/0009568 | A1 | 1/2006 | Cabioch et al. | |
| 2008/0275159 | A1 | 11/2008 | Cabioch et al. | |
| 2008/0275160 | A1 | 11/2008 | Cabioch et al. | |
| 2014/0200306 | A1 * | 7/2014 | Cho | C08L 15/00 556/413 |
| 2020/0207956 | A1 | 7/2020 | Kanbara et al. | |
| 2020/0254816 | A1 | 8/2020 | Koda et al. | |

FOREIGN PATENT DOCUMENTS

| | | | |
|---|---|---|---|
| EP | 0 603 886 A1 | 6/1994 | |
| EP | 0 603 886 B1 | 8/1997 | |
| JP | 2-60947 A | 3/1990 | |
| JP | 6-239909 A | 8/1994 | |
| JP | 9-132609 A | 5/1997 | |
| JP | 2002-60549 A | 2/2002 | |
| JP | 2005-200598 A | 7/2005 | |
| JP | 2006-515897 A | 6/2006 | |
| JP | 2011-132298 A | 7/2011 | |
| JP | 2013-139522 A | 7/2013 | |
| WO | WO-2018047008 A2 * | 3/2018 | ................ C08F 2/38 |
| WO | WO 2019/044888 A1 | 3/2019 | |
| WO | WO 2019/044893 A1 | 3/2019 | |

OTHER PUBLICATIONS

Quack, G.; Fetters, L. J. Macromolecules, 1978, 11, 369. (Year: 1978).*
Pichugim, "Materials Science Aspects of Tyre Rubber Development", XIV International Scientific and Practical Conference, Rubber and rubber, 2008, No. 5, pp. 1-11 (35 total pages) (with English translation).
Extended European Search Report issued Jun. 2, 2023 in European Patent Application No. 20809620.6, 8 pages.
"Database WPI", Thomson Scientific, Mar. 1, 1990, 2 pages.
International Search Report and Written Opinion issued Aug. 11, 2020 in PCT/JP2020/020051 filed May 21, 2020, 6 pages.

* cited by examiner

*Primary Examiner* — Michael F Pepitone
(74) *Attorney, Agent, or Firm* — Oblon, McClelland, Maier & Neustadt, L.L.P.

(57) ABSTRACT

A diene rubber may give a crosslinked product or forming a rubber composition which has high levels of both ice grip performance and wet grip performance; a rubber composition may include the diene rubber; a tire member may be formed from the rubber composition or a crosslinked product thereof; and a tire may include the rubber composition or a crosslinked product thereof as at least a portion thereof. A resin modifier may include the diene rubber and give such a resin composition. A diene rubber may include butadiene units and an $M_w$ of 5,000 to 50,000, and may satisfy (i) to (iii): (i) $\beta_{cp} > 0$; (ii) $\beta_{12} > 40$; and (iii) $\beta_{cp}/(\beta_{12}-40) \leq 2$, wherein $\beta_{12}$ is the mol % of 1,2-bonded butadiene units, and $\beta_{cp}$ is the mol % of specific structural units, both with respect to all butadiene units present in the diene rubber.

20 Claims, No Drawings

DIENE RUBBER AND RUBBER COMPOSITION

CROSS-REFERENCE TO RELATED APPLICATIONS

The present application is the national stage of international application PCT/JP2020/020051, filed on May 21, 2020, and claims the benefit of the filing date of Japanese Appl. No. 2019-095781, filed on May 22, 2019.

TECHNICAL FIELD

The present invention relates to a diene rubber, a rubber composition including the diene rubber, a crosslinked product including the rubber composition, and to a tire tread, a bead filler, a tire belt and a pneumatic tire which each at least partially include the rubber composition or the crosslinked product. The present invention also relates to a resin modifier including the diene rubber.

BACKGROUND ART

Pneumatic tires such as, in particular, all-season tires, winter tires and studless tires, are required not only to have mechanical properties such as abrasion resistance, hardness and strength but also to satisfy high levels of other performances at the same time such as grip performance on wet roads (wet grip performance) and grip performance at low temperatures or on snow (ice grip performance).

The wet grip performance is effectively enhanced by increasing Tan δ (hysteresis loss). However, increasing Tan δ by the addition of an additive such as a resin lowers the flexibility of the rubber.

The ice grip performance is effectively enhanced by increasing the area of contact between the tire and ice or snow and also by improving the flexibility of the tire at low temperatures. As known in the art, flexibility may be imparted to tires by using a solid rubber having a low glass transition temperature (Tg), by reducing the amount of carbon black that is added, by controlling the average particle size of carbon black to about 100 to 200 nm, or by adding a softener such as an oil. Unfortunately, tires improved in ice grip performance by the impartation of flexibility disadvantageously exhibit lowered wet grip performance. Further, the addition of a softener such as an oil results in a problem in which the softener bleeds out from the blend with time and the rubber becomes hard over time, or a problem in which the tensile modulus is lowered to cause a decrease in mechanical strength of the tires.

In order to enhance mechanical properties of a rubber composition that is obtained or of a crosslinked product of the rubber composition, a filler such as carbon black or silica is generally added as a rubber reinforcing agent to the rubber composition. However, this known approach deteriorates the processability at the time of manufacturing and is thus accompanied by the use of a processability improver such as a process oil or a liquid polymer. While a conventional processability improver offers enhanced processability, a problem remains in that the ice grip performance and the wet grip performance cannot be satisfied concurrently at a high level.

Patent Literature 1 describes a rubber composition that includes a coumarone indene resin having a softening point of not more than 50° C., and describes that ice grip performance and abrasion resistance can be improved in a well-balanced manner. Patent Literature 2 describes a rubber composition that includes a styrene butadiene rubber having a specific amount of bonded styrene and a specific vinyl content, a low-molecular butadiene rubber having a specific content of cis-1,4-structures and a specific weight average molecular weight, and silica in a specific blending ratio, and describes that the rubber composition attains enhanced on-ice performance and wet grip performance. Patent Literature 3 describes a composition that includes a linear or branched diene elastomer formed from at least one type of a conjugated diene, and a reinforcing filler, the elastomer containing not less than 15% by mass of cyclic vinyl units and having a number average molecular weight of 30,000 to 350,000 g/mol, and describes that the composition attains improvements in hysteresis loss and tensile modulus.

CITATION LIST

Patent Literature

Patent Literature 1: JP-A-2013-139522
Patent Literature 2: JP-A-2002-060549
Patent Literature 3: JP-A-2006-515897

SUMMARY OF INVENTION

Technical Problem

Although the rubber compositions described in Patent Literatures 1 to 3 are improved in abrasion resistance and various braking performances as compared with the conventional compositions, they are still unsatisfactory in the concurrent satisfaction of ice grip performance and wet grip performance and need further improvements.

The present invention has been made in light of the circumstances discussed above. Objects of the present invention are therefore to provide a diene rubber that is capable of giving a crosslinked product or forming a rubber composition which has high levels of both ice grip performance and wet grip performance, to provide a rubber composition including the diene rubber, to provide a tire member formed from the rubber composition or a crosslinked product of the rubber composition, and to provide a tire including the rubber composition or a crosslinked product of the rubber composition as at least a portion thereof. The present invention has another object of providing a resin modifier that includes the diene rubber and is capable of giving a resin composition having the characteristics described above.

Solution to Problem

After extensive studies, the present inventors have found that a specific diene rubber having a relatively low molecular weight can form, together with other components, a rubber composition which, in the form of the rubber composition or a crosslinked product of the rubber composition, achieves high levels of wet grip performance and ice grip performance at the same time. The present inventors have also found that the diene rubber is useful as a resin modifier, thus completing the present invention.

Specifically, the present invention pertains to the following [1] to [12].

[1] A diene rubber (A) including butadiene units and having a weight average molecular weight of 5,000 to 50,000, the diene rubber (A) satisfying (i) to (iii) below in which $\beta_{12}$ is the mol % of 1,2-bonded butadiene units, and $\beta_{cp}$ is the mol % of structural units represented by the formula (1) below, both with respect to all the butadiene units present in the diene rubber (A), (i) $\beta_{cp} > 0$
(ii) $\beta_{12} > 40$
(iii) $\beta_{cp}/(\beta_{12}-40) \leq 2$

[Chem. 1]

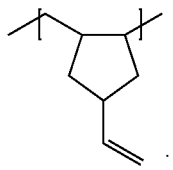

(1)

[2] A rubber composition including the diene rubber (A) described in [1].

[3] The rubber composition according to [2], further including a solid rubber (B).

[4] The rubber composition according to [2] or [3], further including a filler (C).

[5] A crosslinked product obtained by crosslinking the rubber composition described in any of [2] to [4].

[6] A tire tread including, as at least a portion of the tire tread, the rubber composition described in any of [2] to [4] or the crosslinked product described in [5].

[7] A bead filler including, as at least a portion of the bead filler, the rubber composition described in any of [2] to [4] or the crosslinked product described in [5].

[8] A tire belt including, as at least a portion of the tire belt, the rubber composition described in any of [2] to [4] or the crosslinked product described in [5].

[9] A pneumatic tire including, as at least a portion of the pneumatic tire, the rubber composition described in any of [2] to [4] or the crosslinked product described in [5].

[10] The pneumatic tire according to [9], wherein the pneumatic tire is a winter tire or a studless tire.

[11] The pneumatic tire according to [9], wherein the pneumatic tire is an all-season tire.

[12] A resin modifier including the diene rubber (A) described in [1].

Advantageous Effects of Invention

The diene rubber obtained according to the present invention may serve as a component added to a rubber composition to allow the rubber composition or a crosslinked product of the rubber composition to achieve high levels of wet grip performance and ice grip performance at the same time. Thus, a material that uses the rubber composition or the crosslinked product as a portion thereof is useful as a tire tread, a bead filler, a tire belt or a pneumatic tire. Further, a resin composition including the diene rubber also has the characteristics described above, and thus the diene rubber may be used as a resin modifier.

DESCRIPTION OF EMBODIMENTS

[Diene Rubbers (A)]

A diene rubber (A) of the present invention is a low-molecular polymer that has a weight average molecular weight (Mw) in the range of 5,000 to 50,000, contains butadiene units, and satisfies (i) to (iii) below in which $\beta_{12}$ is the mol % of 1,2-bonded butadiene units, and $\beta_{cp}$ is the mol % of structural units represented by the formula (1) described hereinabove, both with respect to all the butadiene units present in the diene rubber (A).

(i) $\beta_{cp} > 0$
(ii) $\beta_{12} > 40$
(iii) $\beta_{cp}/(\beta_{12}-40) \leq 2$ The weight average molecular weight (Mw) of the diene rubber (A) is in the range of 5,000 to 50,000, and is preferably not more than 40,000, more preferably not more than 30,000, and still more preferably not more than 20,000. The weight average molecular weight (Mw) of the diene rubber (A) is preferably not less than 5,500, more preferably not less than 6,000, and still more preferably not less than 6,500. In the present invention, the Mw of the diene rubber (A) is a polystyrene-equivalent weight average molecular weight determined by gel permeation chromatography (GPC) measurement. The above range of Mw of the diene rubber (A) ensures that excellent process flow efficiency is exhibited at the time of manufacturing and good economic efficiency is obtained, and further ensures that good processability is attained when preparing or using a rubber composition that includes a solid rubber (B) described later or a resin composition that includes a resin.

The molecular weight distribution (Mw/Mn) of the diene rubber (A) is preferably 1.0 to 20.0, more preferably 1.0 to 15.0, still more preferably 1.0 to 10.0, particularly preferably 1.0 to 5.0, and most preferably 1.0 to 2.0. When the Mw/Mn is in the above range, the diene rubber (A) that is obtained advantageously has a small variation in viscosity. The molecular weight distribution (Mw/Mn) is the ratio of the weight average molecular weight (Mw) to the number average molecular weight (Mn) measured by GPC relative to standard polystyrenes.

The diene rubber (A) includes butadiene units as monomer units constituting the polymer. In a preferred embodiment of the diene rubber (A), the butadiene units represent not less than 50 mass % of all the monomer units constituting the polymer. The content of the butadiene units is preferably 60 to 100 mass %, and more preferably 70 to 100 mass % of all the monomer units in the diene rubber (A). Incidentally, the content of the butadiene units may be determined in consideration of a factor such as the compatibility with a solid rubber (B). When, for example, a butadiene rubber, an isoprene rubber or a natural rubber is present as a solid rubber (B) component, it is preferable that the total content of the butadiene units be 100 mass %.

Examples of additional monomer units that may be contained in the diene rubber (A) in addition to the butadiene units include conjugated diene (a1) units other than from butadiene, and aromatic vinyl compound (a2) units.

Examples of the conjugated dienes (a1) other than butadiene include isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Among these conjugated dienes (a1), isoprene is preferable.

Examples of the aromatic vinyl compounds (a2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Among these aromatic vinyl compounds, styrene, α-methylstyrene and 4-methylstyrene are preferable.

The content of the additional monomer units other than the butadiene units in the diene rubber (A) is preferably not more than 50 mass %, more preferably not more than 40 mass %, and still more preferably not more than 30 mass %.

The diene rubber (A) necessarily includes structural units represented by the formula (1) below, that is, the mol % of the structural units represented by the formula (1) below ($\beta_{cp}$ mol %) is necessarily more than 0 mol % ($\beta_{cp}>0$) relative to all the butadiene units (requirement (i)).

[Chem. 2]

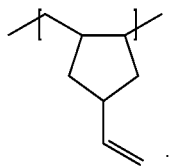

(1)

As a result of the diene rubber (A) including such structural units, a rubber composition that includes the diene rubber (A) and a solid rubber (B) or a crosslinked product that is obtained from the rubber composition can concurrently satisfy ice grip performance and wet grip performance. To enhance the ice grip performance and the wet grip performance, the $\beta_{cp}$ mol % is preferably not less than 0.5 mol % ($\beta_{cp} \geq 0.5$), and more preferably not less than 0.8 mol % ($\beta_{cp} \geq 0.8$). The $\beta_{cp}$ mol % is usually not more than 30 mol % ($\beta_{cp} \leq 30$). The mol % of the structural units represented by the formula (1) may be calculated from the ratio of the area of the peak assigned to the structural units of the formula (1) to the area of the peaks assigned to other butadiene units (1,2-bonded butadiene units, 1,4-bonded butadiene units) according to $^1$H-NMR. The mol % ($\beta_{cp}$ mol %) of the structural units represented by the formula (1) in the diene rubber (A) may be brought to a desired value by, for example, selecting the types of a solvent and an optional polar compound used in the production of the diene rubber (A), or controlling the production conditions such as polymerization temperature, monomer (butadiene) concentration, and the feed rate at which the monomer is supplied continuously or intermittently to the polymerization system.

The mol % ($\beta_{12}$ mol %) of 1,2-bonded butadiene units relative to all the butadiene units in the diene rubber (A) is more than 40 mol % ($\beta_{12}>40$) (requirement (ii)). A rubber composition that includes the diene rubber (A) having such a content of 1,2-bonds together with a solid rubber (B), or a crosslinked product obtained from the rubber composition is advantageous in that the Tan δ of the rubber composition is increased and excellent wet grip performance and ice grip performance are obtained. From the point of view of enhancing the wet grip performance and the ice grip performance, the $\beta_{12}$ mol % is preferably not less than 42 mol % ($\beta_{12} \geq 42$). From the point of view of (handleability), the $\beta_{12}$ mol % is preferably not more than 80 mol % ($\beta_{12} \leq 80$), and more preferably not more than 70 mol % ($\beta_{12} \leq 70$). The mol % of the 1,2-bonded butadiene units may be calculated from the ratio of the area of the peak assigned to the 1,2-bonded butadiene units to the area of the peaks assigned to other butadiene units (1,4-bonded butadiene units, the structural units represented by the formula (1)) according to $^1$H-NMR. The mol % ($\beta_{12}$ mol %) of the 1,2-bonded butadiene units in the diene rubber (A) may be brought to a desired value by, for example, selecting the types of a solvent and an optional polar compound used in the production of the diene rubber (A), or controlling the production conditions such as polymerization temperature.

In the diene rubber (A), the $\beta_{12}$ mol % and the $\beta_{cp}$ mol % necessarily satisfy $\beta_{cp}/(\beta_{12}-40) \leq 2$ (requirement (iii)).

As described hereinabove, a high mol % (for example, more than 40 mol %) of 1,2-bonds in the butadiene units present in the diene rubber (A) leads to a high Tg of the liquid rubber and thus increases the Tg of a rubber composition to which the rubber is added, thereby enhancing the ice grip performance and the wet grip performance. In order to ensure that a crosslinked product of a rubber composition including a solid rubber (B) and a low-molecular diene rubber will exhibit enhanced ice grip performance and wet grip performance, the value of Tan δ of the crosslinked product needs to be high throughout a wide range of temperatures from −20° C. to 30° C. Increased values of Tan δ of such a crosslinked product throughout the above wide range of temperatures are hardly obtained by simply increasing the mol % of 1,2-bonds in the diene rubber, and an important role is played by the incorporation of the structural units represented by the formula (1) into the diene rubber (A). If, on the other hand, the structures of the formula (1) represent a large proportion in the diene rubber (A), a rubber composition including the diene rubber (A) and a solid rubber (B) gives a crosslinked product that exhibits an excessively high elastic modulus and fails to attain desired properties such as flexibility and hardness expected from the characteristics of the solid rubber (B). Studies by the present inventors have found that whether the crosslinked product attains the desired properties such as flexibility and hardness while still exhibiting enhanced ice grip performance and wet grip performance is critically affected by the ratio of the mol % of the structural units represented by the formula (1) to the excess of the mol % of 1,2-bonds over 40%. If the 1,2-bonds have an increased mol % relative to the mol % of the structural units of the formula (1) in the diene rubber (A), and when a rubber composition including such a diene rubber (A) and a solid rubber (B) is subjected to a crosslinking process, the diene rubber (A) is crosslinked at such an increased rate that the crosslinked product that is obtained tends to have a higher degree of crosslinking. On the other hand, the structural units of the formula (1) offer the highest glass transition temperature among other structural units derived from butadiene, and are crosslinked less easily than other butadiene units. Probably as a result of these two types of structures being present in a specific ratio, the values of Tan δ can be high throughout a wide range of temperatures from −20° C. to 30° C. while still ensuring an appropriate degree of crosslinking.

To ensure that a crosslinked product that is obtained will attain further enhancements in ice grip performance and wet grip performance, $\beta_{cp}/(\beta_{12}-40)$ is preferably not more than 1.8 ($\beta_{cp}/(\beta_{12}-40) \leq 1.8$), more preferably not more than 1.5 ($\beta_{cp}/(\beta_{12}-40) \leq 1.5$), particularly preferably not more than 0.7 ($\beta_{cp}/(\beta_{12}-40) \leq 0.7$), and $\beta_{cp}/(\beta_{12}-40)$ is most preferably not more than 0.4 ($\beta_{cp}/(\beta_{12}-40) \leq 0.4$).

The melt viscosity of the diene rubber (A) measured at 38° C. is preferably 0.1 to 2,000 Pa·s, more preferably 0.1 to 1500 Pa·s, still more preferably 0.1 to 1000 Pa·s, further preferably 0.1 to 500 Pa·s, furthermore preferably 0.1 to 250 Pa·s, particularly preferably 0.1 to 100 Pa·s, and most preferably 0.1 to 50 Pa·s. When the melt viscosity of the diene rubber (A) is in the above range, a rubber composition including such a diene rubber and a solid rubber (B)

described later exhibits enhanced flexibility and thus attains improved processability. The melt viscosity of the diene rubber (A) may be brought to a desired value by, for example, controlling Mw and Mw/Mn of the diene rubber (A). In the present invention, the melt viscosity of the diene rubber (A) is a value measured with a Brookfield viscometer at 38° C.

The Tg of the diene rubber (A) is preferably not more than 0° C. The Tg is variable depending on factors such as the mol % of 1,2-bonds (and 3,4-bonds) in the butadiene units and the conjugated diene (a1) units other than butadiene, the type of the conjugated diene (a1), and the content of units derived from monomers other than conjugated dienes. From the points of view of abrasion resistance, ice grip performance and rolling resistance performance, the Tg is more preferably not more than −10° C., still more preferably not more than −20° C., even more preferably not more than −30° C., further preferably not more than −40° C., furthermore preferably not more than −50° C., particularly preferably not more than −60° C., and most preferably not more than −70° C. From the points of view of steering stability performance, dry grip performance and wet grip performance, the Tg of the diene rubber (A) is preferably not less than −100° C., more preferably not less than −90° C., still more preferably not less than −70° C., further preferably not less than −60° C., particularly preferably not less than −40° C., and most preferably not less than −20° C.

The diene rubber (A) is obtained by polymerizing butadiene and optionally an additional monomer other than butadiene by, for example, an emulsion polymerization process or a solution polymerization process.

The emulsion polymerization process may be a known process or a process that is deemed as known. For example, monomers including a prescribed amount of the conjugated diene may be emulsified and dispersed in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as a dispersion medium. The dispersion medium may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the diene rubber (A) that is obtained, a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the diene rubber (A) is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the polymer. Next, the polymer is washed with water, dehydrated and dried. In this manner, the diene rubber (A) may be obtained. During the coagulation process, the latex may be mixed together with an emulsified dispersion of an extender oil as required, and the diene rubber (A) may be recovered as an oil-extended rubber.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Among the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Among these organoalkali metal compounds, organolithium compounds are preferable, and organomonolithium compounds are more preferable.

The amount in which the organoalkali metal compound is used may be determined appropriately in accordance with factors such as the melt viscosity and molecular weight of the diene rubber (A). Usually, the amount of such a compound is 0.01 to 3 parts by mass per 100 parts by mass of all the monomers including the conjugated diene.

The organoalkali metal compound may be used in the form of an organoalkali metal amide by being subjected to a reaction with a secondary amine such as dibutylamine, dihexylamine or dibenzylamine.

In the anionic polymerization, a polar compound is usually used to control the microstructures of conjugated diene units (for example, 1,2-bonded butadiene units, 1,4-bonded butadiene units, and vinylcyclopentane (VCP) structures represented by the formula (1)) without deactivating the reaction. Examples of the polar compounds include ethers such as dimethyl ether, diethyl ether, tetrahydrofuran and 2,2-di(2-tetrahydrofuryl)propane (DTHFP); glycol ethers such as ethylene glycol dimethyl ether, diethylene glycol dimethyl ether, triethylene glycol dimethyl ether and tetraethylene glycol dimethyl ether; amines such as triethylamine, N,N,N',NT-tetramethylenediamine, N,N,N',N'-tetramethylethylenediamine (TMEDA) and N-methylmorpholine; and metal salts such as sodium or potassium salts of aliphatic alcohols including sodium t-butyrate, sodium t-amylate and sodium isopentylate, and sodium or potassium salts of alicyclic alcohols including dialkyl sodium cyclohexanolates, for example, sodium mentholate. These polar compounds may be used singly, or two or more may be used in combination. The polar compound is usually used in an amount of 0.01 to 1000 mol per mol of the organoalkali metal compound (the polymerization initiator). To facilitate that the $\beta_{12}$ mol % (the mol % of 1,2-bonded butadiene units) will fall in a desired range satisfying at least the requirement (ii), the polar compound is preferably used in an amount of 0.1 to 1000 mol, more preferably 0.1 to 2 mol, still more preferably 0.1 to 1 mol, and further preferably 0.1 to 0.9 mol per mol of the organoalkali metal compound.

In order to lower the $\beta_{cp}$ mol % (the mol % of the structural units represented by the formula (1)) and to facilitate that at least the requirement (iii) will be satisfied, the anionic polymerization is preferably performed in such a manner that the monomer is not exhausted in the polymerization system during the course of monomer feeding, and is more preferably performed while sequentially feeding the monomer until the monomer is completely fed. In the case of sequential feeding, the rate of feeding of butadiene, in particular with respect to 1 mol of the initiator, is preferably not less than 0.1 mol/min, more preferably not less than 0.3 mol/min, and still more preferably not less than 0.5 mol/min. To facilitate the control of the polymerization temperature during the anionic polymerization, the feed rate during sequential feeding of butadiene is preferably not more than 50 mol/min, and more preferably not more than 10 mol/min with respect to 1 mol of the initiator.

The temperature of the solution polymerization is usually in the range of −80 to 150° C., preferably 0 to 100° C., and more preferably 10 to 90° C. The polymerization mode may be batchwise or continuous.

The polymerization reaction may be terminated by the addition of a polymerization terminator. Examples of the polymerization terminators include alcohols such as methanol and isopropanol. The diene rubber (A) may be isolated by pouring the polymerization reaction liquid into a poor solvent such as methanol to precipitate the diene rubber (A), or by washing the polymerization reaction liquid with water followed by separation and drying.

Among the processes for producing the diene rubber (A) described hereinabove, the solution polymerization process is preferable.

In the diene rubber (A), the catalyst residue content ascribed to the polymerization catalyst used in the rubber production is preferably in the range of 0 to 200 ppm in terms of metal. When, for example, the polymerization catalyst used for the production of the diene rubber (A) is an organoalkali metal such as an organolithium compound, the metal based on which the catalyst residue content is determined is the alkali metal such as lithium. The above catalyst residue content ensures that a decrease in tackiness during processing or the like will be avoided and that a rubber composition of the present invention, which will be described later, will give crosslinked products attaining enhancements in heat resistance and rolling resistance performance of tires. The catalyst residue content ascribed to the polymerization catalyst used in the production of the diene rubber (A) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the diene rubber (A) may be controlled to the above specific range by purifying the diene rubber (A) to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in a rubber composition of the present invention described later which includes a solid rubber (B), the diene rubber (A) and a filler (C) is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the solid rubber (B), the diene rubber (A) and/or other components optionally used in the rubber composition.

The diene rubber (A) thus obtained may be used directly or may be used after unsaturated bonds in the diene rubber (A) are reacted with a modifying agent. The diene rubber (A) may be used after at least part of the unsaturated bonds in the diene rubber are hydrogenated.

The diene rubbers (A) may be used singly, or two or more may be used in combination.

[Rubber Compositions]

A rubber composition of the present invention includes the diene rubber (A). As a result of containing the diene rubber (A), the rubber composition exhibits excellent characteristics. When, in particular, the rubber composition includes a solid rubber (B) and a filler (C) described later, the rubber composition or a crosslinked product of the rubber composition attains high levels of wet grip performance and ice grip performance at the same time and also has excellent mechanical properties.

[Solid Rubbers (B)]

The rubber composition of the present invention may further include a solid rubber (B). The solid rubber (B) used in the present invention is a rubber that can be handled as a solid at 20° C. The Mooney viscosity $ML_{1+4}$ of the solid rubber (B) at 100° C. is usually in the range of 20 to 200. This rubber is usually selected from at least one of synthetic rubbers and natural rubbers.

Examples of the solid rubbers (B) include synthetic rubbers such as styrene butadiene rubbers (hereinafter, also written as "SBRs"), butadiene rubbers, isoprene rubbers, butyl rubbers, halogenated butyl rubbers, ethylene propylene diene rubbers, butadiene acrylonitrile copolymer rubbers, chloroprene rubbers, acrylic rubbers, fluororubbers and urethane rubbers; and natural rubbers. Among these solid rubbers (B), natural rubbers, SBRs, butadiene rubbers and isoprene rubbers are preferable, and natural rubbers, butadiene rubbers and SBRs are more preferable. The solid rubbers (B) may be used singly, or two or more may be used in combination.

To ensure that the rubber composition and crosslinked products that are obtained will fully exhibit characteristics, the Mw of the solid rubber (B) is preferably not less than 80,000, and more preferably in the range of 100,000 to 3,000,000.

From the point of view that the rubber composition of the present invention is used as treads of snow tires (winter tires, studless tires) or treads of all-season tires, the glass transition temperature (Tg) of the solid rubber (B) measured by differential thermal analysis is not more than −10° C., preferably not more than −20° C., more preferably not more than −30° C., still more preferably not more than −40° C., further preferably not more than −45° C., particularly preferably not more than −50° C., and most preferably not more than −55° C. When the glass transition temperature is in this range, the rubber composition attains enhanced flexibility at low temperatures and thus the ice grip performance is enhanced. Here, the Tg of the solid rubber (B) is the glass transition temperature of a rubber component substantially making up the solid rubber (B). When, for example, the solid rubber (B) includes a plurality of rubber components, the glass transition temperatures of the plurality of rubber components substantially constituting the solid rubber (B) are each not more than −10° C. In the case where, for example, the rubber components substantially constituting the solid rubber (B) are STR20 (natural rubber from Thailand) and butadiene rubber, the glass transition temperatures of STR20 and butadiene rubber are both not more than −10° C.

The SBRs may be any such rubbers generally used in tire applications. Specifically, those rubbers having a styrene content of 0.1 to 70 mass % are preferable, and the styrene content is more preferably 5 to 60 mass %, still more preferably 5 to 50 mass %, further preferably 5 to 40 mass %, particularly preferably 5 to 30 mass %, and most preferably 5 to 25 mass %. Further, those rubbers having a vinyl content of 0.1 to 80 mass % are preferable, and those having a vinyl content of 5 to 70 mass % are more preferable.

The vinyl content in the SBRs in the present specification means the content of vinyl group-containing monomer units relative to all the butadiene-derived units contained in the SBR. Similarly, the vinyl content in the solid rubber (B) described later means the content of monomer units which actually have a vinyl group relative to the total amount of units from a monomer which can have a vinyl group depending on the manner of bonding.

The Mw of the SBRs is preferably 100,000 to 2,500,000, more preferably 150,000 to 2,000,000, and still more preferably 150,000 to 1,500,000. When the Mw of the SBR is in this range, the rubber composition attains enhanced processability and can give tires which exhibit enhanced wet grip performance and improved mechanical strength, abrasion resistance and steering stability performance.

The Tg of the SBRs measured by differential thermal analysis is not more than −10° C., preferably not more than −20° C., more preferably not more than −30° C., still more preferably not more than −40° C., further preferably not more than −45° C., particularly preferably not more than −50° C., and most preferably not more than −55° C. When the glass transition temperature is in this range, the rubber composition attains enhanced flexibility at low temperatures and thus the ice grip performance is enhanced.

The SBR may be obtained by copolymerizing styrene and butadiene. The SBR production process is not limited and may be any of emulsion polymerization, solution polymerization, gas-phase polymerization and bulk polymerization. Among these production processes, emulsion polymerization and solution polymerization are preferable.

An emulsion-polymerized styrene butadiene rubber (hereinafter, also written as E-SBR) may be produced by a usual emulsion polymerization process. For example, such a rubber may be obtained by emulsifying and dispersing predetermined amounts of styrene and butadiene monomers in the presence of an emulsifier and emulsion polymerizing the monomers with a radical polymerization initiator.

Examples of the emulsifiers which may be used include long-chain fatty acid salts having 10 or more carbon atoms, and rosin acid salts. Specific examples include potassium salts and sodium salts of fatty acids such as capric acid, lauric acid, myristic acid, palmitic acid, oleic acid and stearic acid.

Usually, water is used as the dispersion medium. The dispersion medium may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the E-SBR that is obtained, a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with the type of the radical polymerization initiator used. In usual cases, the temperature is preferably 0 to 100° C., and more preferably 0 to 60° C. The polymerization mode may be continuous or batchwise. The polymerization reaction may be terminated by the addition of a polymerization terminator.

Examples of the polymerization terminators include amine compounds such as isopropylhydroxylamine, diethylhydroxylamine and hydroxylamine; quinone compounds such as hydroquinone and benzoquinone; and sodium nitrite.

The termination of the polymerization reaction may be followed by the addition of an antioxidant as required. After the termination of the polymerization reaction, the latex obtained is cleaned of the unreacted monomers as required, and the polymer is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the polymer as crumb. The crumb is washed with water, then dehydrated, and dried with a band dryer or the like to give E-SBR. During the coagulation process, the latex may be mixed together with an emulsified dispersion of an extender oil as required, and the rubber may be recovered as an oil-extended rubber. It is noted that an extender oil is not regarded as a component of the solid rubber (B) in the rubber composition in the present specification.

Examples of the commercially available E-SBRs include oil-extended styrene butadiene rubber "JSR1723" manufactured by JSR Corporation.

A solution polymerized styrene butadiene rubber (hereinafter, also written as S-SBR) may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Among these active metals, alkali metals and alkaline earth metals are preferable, and alkali metals are more preferable. Among the alkali metals, organoalkali metal compounds are more preferably used.

Examples of the organoalkali metal compounds include organomonolithium compounds such as n-butyllithium, sec-butyllithium, t-butyllithium, hexyl lithium, phenyl lithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compound is used may be determined appropriately in accordance with the desired molecular weight of S-SBR. The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene units and controlling the distribution of styrene in copolymer chains. Examples include ether compounds such as dibutyl ether, tetrahydrofuran and ethylene glycol diethyl ether; tertiary amines such as N,N,N',N'-tetramethylethylenediamine and trimethylamine; alkali metal alkoxides; and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific composition ratio.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of modifying agents described in JP-A-2011-132298. In the modified SBR, the functional groups may be introduced at polymer ends or polymer side chains.

Examples of the isoprene rubbers which may be used include commercially available isoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed isoprene rubbers are preferable because they have a high cis content. Use may be made of ultrahigh cis isoprene rubbers obtained using lanthanoid rare earth metal catalysts.

The vinyl content in the isoprene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −20° C., and more preferably not more than −30° C.

The Mw of the isoprene rubbers is preferably 90,000 to 2,000,000, and more preferably 150,000 to 1,500,000. This Mw ensures that high processability and mechanical strength are obtained.

As long as the advantageous effects of the present invention are not impaired, the isoprene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the butadiene rubbers which may be used include commercially available butadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed butadiene rubbers are preferable because they have a high cis content. Use may be made of ultrahigh cis butadiene rubbers (for example, 95% or more cis content) obtained using lanthanoid rare earth metal catalysts.

The vinyl content in the butadiene rubbers is preferably not more than 50 mass %, more preferably not more than 40 mass %, and still more preferably not more than 30 mass %. If the vinyl content exceeds 50 mass %, the rolling resistance performance (low fuel consumption performance) and the abrasion resistance tend to deteriorate. The lower limit of the vinyl content is not particularly limited. The glass transition temperature, although variable depending on the vinyl content, is preferably not more than −40° C., and more preferably not more than −50° C.

The Mw of the butadiene rubbers is preferably 90,000 to 2,000,000, and more preferably 150,000 to 1,500,000.

When the Mw is in this range, the rubber composition attains enhanced processability, and tires including the rubber composition as a portion thereof achieve enhancements in ice grip performance, abrasion resistance and steering stability performance.

As long as the advantageous effects of the invention are not impaired, the butadiene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

At least one of the SBRs, the isoprene rubbers and the butadiene rubbers may be used in combination with one, or two or more of, for example, butyl rubbers, halogenated butyl rubbers, ethylene propylene diene rubbers, butadiene acrylonitrile copolymer rubbers and chloroprene rubbers. These rubbers may be produced by any methods without limitation, or commercial products may be used.

Examples of the natural rubbers include those natural rubbers, high-purity natural rubbers and modified natural rubbers such as epoxidized natural rubbers, hydroxylated natural rubbers, hydrogenated natural rubbers and grafted natural rubbers generally used in the tire industry, with specific examples including TSRs (technically specified rubbers) such as SMRs (TSRs from Malaysia), SIRs (TSRs from Indonesia) and STRs (TSRs from Thailand), and RSSs (ribbed smoked sheets). In particular, SMR 20, STR 20 and RSS #3 are preferable from the points of view of uniform quality and high availability. The natural rubbers may be used singly, or two or more may be used in combination. In the present invention, the synthetic rubbers and the natural rubbers may be used together.

When the rubber composition includes the diene rubber (A) and the solid rubber (B), the content of the diene rubber (A) is preferably 0.1 to 50 parts by mass with respect to 100 parts by mass of the solid rubber (B), and is more preferably 0.1 to 45 parts by mass, still more preferably 0.5 to 40 parts by mass, further preferably 1 to 40 parts by mass, furthermore preferably 2 to 40 parts by mass, particularly preferably 2 to 30 parts by mass, and most preferably 2 to 20 parts by mass. When the content of the diene rubber (A) is in the above range, a crosslinked product that is obtained attains excellent wet grip performance and ice grip performance without bleeding out of the diene rubber (A) from the solid rubber (B).

When the rubber composition further includes a filler (C), the above range of the content of the diene rubber (A) ensures that the filler (C) will have good dispersibility in the rubber composition and a crosslinked product that is obtained will have high levels of wet grip performance and ice grip performance at the same time and also will have good mechanical properties.

[Fillers (C)]

The rubber composition of the present invention may include a filler (C). The filler (C) used in the rubber composition of the present invention is not limited. For purposes such as to improve properties such as mechanical strength and to enhance the dry grip performance, wet grip performance, steering stability performance and low fuel consumption performance of tires including the rubber composition as portions thereof, at least one selected from carbon blacks and silicas is preferable. In a preferred embodiment, the composition includes carbon black as the filler (C). In another preferred embodiment, the composition includes silica as the filler (C). In another preferred embodiment, the composition includes carbon black and silica as the fillers (C).

Examples of the carbon blacks include furnace blacks, channel blacks, thermal blacks, acetylene blacks and Ketjen blacks. From the points of view of enhancing the crosslinking rate, enhancing the mechanical strength of crosslinked products that are obtained, and enhancing the dry grip performance, wet grip performance, steering stability performance and low fuel consumption performance of tires including the rubber composition as portions thereof, furnace blacks are preferable among the above carbon blacks. The carbon blacks may be used singly, or two or more may be used in combination.

To attain enhancements in dry grip performance, wet grip performance and low fuel consumption performance of tires including the rubber composition as portions thereof, the average particle diameter of the carbon blacks is preferably not less than 5 nm, more preferably not less than 10 nm, and still more preferably not less than 15 nm, and is preferably not more than 100 nm, more preferably not more than 80 nm, still more preferably not more than 70 nm, and particularly preferably not more than 60 nm. The average particle diameter of the carbon black may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the solid rubber (B), the carbon blacks may be treated with acids such as nitric acid, sulfuric acid, hydrochloric acid and mixed acids of these acids, or may be subjected to surface oxidation treatment by heating in the presence of air. To enhance the mechanical strength of the inventive rubber composition and crosslinked products obtained from the composition, the carbon blacks may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon blacks may be used after their grain size is adjusted by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

Examples of the silicas include wet silicas (hydrous silicates), dry silicas (silicic anhydrides), calcium silicates and aluminum silicates. Among these silicas, wet silicas are preferable to attain further enhancements in processability, the mechanical strength and abrasion resistance of crosslinked products that are obtained, and the dry grip performance, wet grip performance, steering stability performance and low fuel consumption performance of tires including the rubber composition as portions thereof. The silicas may be used singly, or two or more may be used in combination.

To attain enhancements in the processability of the rubber composition, and the dry grip performance, wet grip performance and low fuel consumption performance of tires including the rubber composition as portions thereof, the average particle diameter of the silicas is preferably not less than 0.5 nm, more preferably not less than 2 nm, still more preferably not less than 5 nm, particularly preferably not less than 8 nm, and most preferably not less than 10 nm, and is preferably not more than 200 nm, more preferably not more than 150 nm, still more preferably not more than 100 nm, further preferably not more than 50 nm, particularly preferably not more than 30 nm, and most preferably not more than 20 nm. The average particle diameter of the silica may be determined by measuring the diameters of the particles with a transmission electron microscope and calculating the average of the diameters.

Among the carbon blacks and the silicas described above, the silicas are more preferable as the fillers (C) from points of view such as enhancing the rolling resistance performance of the obtainable rubber composition and crosslinked products thereof.

In the present invention, the rubber composition may include a filler other than silicas and carbon blacks for purposes such as to enhance the mechanical strength of tires including the rubber composition as portions thereof, and to improve production costs by adding the filler as an extender.

Examples of the fillers other than silicas and carbon blacks include organic fillers, and inorganic fillers such as clays, talcs, micas, calcium carbonate, magnesium hydroxide, aluminum hydroxide, barium sulfate, titanium oxides, glass fibers, fibrous fillers and glass balloons. These fillers may be used singly, or two or more may be used in combination.

When the rubber composition of the present invention includes the diene rubber (A), the solid rubber (B) and the filler (C), the content of the filler (C) is preferably 20 to 200 parts by mass per 100 parts by mass of the solid rubber (B). When the amount of the filler (C) is in this range, tires including the rubber composition as portions thereof attain enhancements in dry grip performance, wet grip performance and low fuel consumption performance. From the above point of view, the amount of the filler (C) per 100 parts by mass of the solid rubber (B) is more preferably not less than 30 parts by mass, still more preferably not less than 40 parts by mass, further preferably not less than 50 parts by mass, and particularly preferably not less than 60 parts by mass, and is preferably not more than 150 parts by mass, more preferably not more than 120 parts by mass, still more preferably not more than 100 parts by mass, even more preferably not more than 90 parts by mass, further preferably not more than 80 parts by mass, and particularly preferably not more than 70 parts by mass.

When the rubber composition of the present invention includes the diene rubber (A), the solid rubber (B) and the filler (C), and when silica is used as the filler (C), the amount of the silica per 100 parts by mass of the solid rubber (B) is preferably not less than 20 parts by mass, more preferably not less than 25 parts by mass, still more preferably not less than 30 parts by mass, further preferably not less than 35 parts by mass, particularly preferably not less than 40 parts by mass, and most preferably not less than 45 parts by mass, and is preferably not more than 100 parts by mass, more preferably not more than 90 parts by mass, still more preferably not more than 80 parts by mass, even more preferably not more than 70 parts by mass, further preferably not more than 65 parts by mass, particularly preferably not more than 60 parts by mass, and most preferably not more than 55 parts by mass, from the point of view of enhancing the dry grip performance, wet grip performance and low fuel consumption performance of tires including the rubber composition as portions thereof.

When the rubber composition of the present invention includes the diene rubber (A), the solid rubber (B) and the filler (C), and when carbon black is used as the filler (C), the amount of the carbon black per 100 parts by mass of the solid rubber (B) is preferably not less than 10 parts by mass, more preferably not less than 20 parts by mass, still more preferably not less than 30 parts by mass, and particularly preferably not less than 40 parts by mass, and is preferably not more than 120 parts by mass, more preferably not more than 100 parts by mass, still more preferably not more than 80 parts by mass, even more preferably not more than 70 parts by mass, further preferably not more than 60 parts by mass, particularly preferably not more than 55 parts by mass, and most preferably not more than 50 parts by mass, from the point of view of enhancing the dry grip performance, wet grip performance and low fuel consumption performance of tires including the rubber composition as portions thereof.

When the silica and the carbon black are used in combination, the ratio of the silica to the carbon black (mass ratio=silica/carbon black) is preferably 1/99 to 99/1, more preferably 10/90 to 90/10, and still more preferably 30/70 to 80/20.

[Additional Components]

When the rubber composition of the present invention includes silica or the like as the filler (C), it is preferable that the composition further include a silane coupling agent. Examples of the silane coupling agents include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N, N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3 triethoxysilylpropyl methacrylate monosulfide, 3-trimethoxysilylpropyl methacrylate monosulfide and 3-octanoylthio-1-propyltriethoxysilane.

Examples of the mercapto compounds include 3-mercaptopropyltrimethoxysilane, 3-mercaptopropyltriethoxysilane, 2-mercaptoethyltrimethoxysilane and 2-mercaptoethyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane, 2-chloroethyltrimethoxysilane and 2-chloroethyltriethoxysilane.

Other compounds may also be used, with examples including octyltriethoxysilane, methyltriethoxysilane, methyltrimethoxysilane and hexadecyltrimethoxysilane.

The silane coupling agents may be used singly, or two or more may be used in combination. Of the above silane coupling agents, sulfur-containing silane coupling agents such as sulfide compounds and mercapto compounds are preferable because of their high reinforcing effects, and bis(3-triethoxysilylpropyl) disulfide, bis(3-triethoxysilylpropyl) tetrasulfide and 3-mercaptopropyltrimethoxysilane are more preferable.

The silane coupling agent is preferably added in an amount of 0.1 to 30 parts by mass, more preferably 0.5 to 20 parts by mass, and still more preferably 1 to 15 parts by mass per 100 parts by mass of the filler (C). This content of the silane coupling agent ensures that dispersibility, coupling effects, reinforcing effects and abrasion resistance will be enhanced.

The rubber composition of the present invention may further contain a vulcanizing agent (D) to crosslink the rubber in the composition. Examples of the vulcanizing agents (D) include sulfur and sulfur compounds. Examples of the sulfur compounds include morpholine disulfides and alkylphenol disulfides. The vulcanizing agents (D) may be used singly, or two or more may be used in combination. When the rubber composition of the present invention includes the diene rubber (A) and the solid rubber (B), the vulcanizing agent (D) is usually added in an amount of 0.1 to 10 parts by mass, preferably 0.5 to 10 parts by mass, and more preferably 0.8 to 5 parts by mass per 100 parts by mass of the solid rubber (B) from the point of view of mechanical properties of crosslinked products.

When, for example, the rubber composition of the present invention contains the vulcanizing agent (D) for crosslinking (vulcanizing) the rubber, the composition may further include a vulcanization accelerator (E). Examples of the vulcanization accelerators (E) include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators (E) may be used singly, or two or more may be used in combination. When the rubber composition of the present invention includes the diene rubber (A) and the solid rubber (B), the vulcanization accelerator (E) is usually added in an amount of 0.1 to 15 parts by mass, and preferably 0.1 to 10 parts by mass per 100 parts by mass of the solid rubber (B).

When, for example, the rubber composition of the present invention contains sulfur, a sulfur compound or the like as the vulcanizing agent (D) for crosslinking (vulcanizing) the rubber, the composition may further include a vulcanization aid (F). Examples of the vulcanization aids (F) include fatty acids such as stearic acid, metal oxides such as zinc oxide, and fatty acid metal salts such as zinc stearate. The vulcanization aids (F) may be used singly, or two or more may be used in combination. When the rubber composition of the present invention includes the diene rubber (A) and the solid rubber (B), the vulcanization aid (F) is usually added in an amount of 0.1 to 15 parts by mass, and preferably 1 to 10 parts by mass per 100 parts by mass of the solid rubber (B).

Besides the vulcanizing agents, crosslinking agents may be added to the rubber composition. Examples of the crosslinking agents include oxygen, organic peroxides, phenolic resins, amino resins, quinone and quinone dioxime derivatives, halogen compounds, aldehyde compounds, alcohol compounds, epoxy compounds, metal halides, organometal halides and silane compounds. These may be used singly, or two or more may be used in combination. When the rubber composition of the present invention includes the diene rubber (A) and the solid rubber (B), the amount of the crosslinking agent is preferably 0.1 to 10 parts by mass per 100 parts by mass of the solid rubber (B).

Where necessary, the rubber composition of the present invention may include, for example, a softener in order to attain improvements in properties such as processability and fluidity while still ensuring that the advantageous effects of the present invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, and resin components such as aliphatic hydrocarbon resins, alicyclic hydrocarbon resins, C9 resins, rosin resins, coumarone-indene resins and phenolic resins. When the rubber composition of the present invention contains the process oil as the softener and also includes the diene rubber (A) and the solid rubber (B), the content of the softener from the point of view of bleeding resistance is preferably not more than 50 parts by mass, more preferably not more than 30 parts by mass, and still more preferably not more than 15 parts by mass per 100 parts by mass of the solid rubber (B).

The rubber composition of the present invention may contain additives as required in order to attain enhancements in properties such as weather resistance, heat resistance and oxidation resistance, while still achieving the advantageous effects of the present invention. Examples of such additives include antioxidants, oxidation inhibitors, waxes, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes.

Examples of the oxidation inhibitors include hindered phenol compounds, phosphorus compounds, lactone compounds and hydroxyl compounds.

Examples of the antioxidants include amine-ketone compounds, imidazole compounds, amine compounds, phenolic compounds, sulfur compounds and phosphorus compounds. The additives may be used singly, or two or more may be used in combination.

[Methods for Producing Rubber Compositions]

The rubber composition of the present invention may be produced by any method without limitation as long as the components described hereinabove can be mixed together homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 50 to 270° C.

The rubber composition of the present invention is preferably used as a crosslinked product (vulcanized rubber) by being crosslinked. The vulcanization conditions and methods are not particularly limited, but the composition is preferably vulcanized with a vulcanization mold under conditions where the vulcanization temperature is 120 to 200° C. and the vulcanization pressure is 0.5 to 20 MPa.

The crosslinked products are preferably such that the diene rubber (A) is extracted therefrom with an extraction ratio of not more than 20 mass %, more preferably not more than 15 mass %, and still more preferably not more than 10 mass %.

The extraction ratio may be calculated by soaking 2 g of the crosslinked product into 400 mL of toluene at 23° C. for 48 hours and determining the amount of the diene rubber (A) extracted into toluene.

[Tire Treads and Pneumatic Tires]

A tire tread of the present invention includes, as at least a portion thereof, the rubber composition described hereinabove, typically the rubber composition including the diene rubber (A), the solid rubber (B) and the filler (C), or a crosslinked product obtained by crosslinking the rubber composition. Such a tire tread has sufficient dry grip performance plus excellent wet grip performance and ice grip performance, and exhibits outstanding steering stability performance. The structure of the tire tread of the present invention is not particularly limited, and may be a monolayer structure or a multilayer structure. In the case of a multilayer structure, the rubber composition is preferably used in the layer that is placed in contact with the road surface.

A pneumatic tire of the present invention includes, as at least a portion thereof, the rubber composition described hereinabove, typically the rubber composition including the diene rubber (A), the solid rubber (B) and the filler (C), or a crosslinked product obtained by crosslinking the rubber composition, and is, in particular, preferably a pneumatic tire including the tire tread described above. The pneumatic tire of the present invention, by virtue of its containing the rubber composition as a portion thereof, has sufficient dry grip performance plus excellent wet grip performance and ice grip performance, and exhibits enhanced steering stability performance and outstanding abrasion resistance. Thus, the pneumatic tires are suited as snow tires such as winter tires and studless tires, and all-season tires.

Examples of the portions of tires in which the rubber composition and crosslinked products of the rubber composition may be used include treads (cap treads, undertreads), sidewalls, rubber reinforcing layers (such as liners) for runflat tires, rim cushions, bead fillers, bead insulations, bead apexes, clinch apexes, belts (tire belts), belt cushions, breakers, breaker cushions, chafers, chafer pads and strip apexes.

[Resin Modifiers]

By virtue of its excellent characteristics described hereinabove, the diene rubber (A) of the present invention may also be used as a resin modifier. The resin modifier including the diene rubber (A) may be used as a resin composition by being mixed with a resin.

The above resin is not particularly limited and may be, for example, a thermosetting resin or a thermoplastic resin. Examples of the thermoplastic resins include olefin resins, styrene resins, polyphenylene ether resins, polycarbonate resins, polyamide resins, isobutylene-isoprene copolymer rubbers and polyurethane thermoplastic elastomers. These thermoplastic resins may be used singly, or two or more may be used in combination. The resin composition may include various additives as required.

The resin composition may be prepared by any of numerous methods without limitation. When, for example, the resin is a thermoplastic resin, the resin composition may be prepared by, for example, mixing the resin modifier including the diene rubber (A), the thermoplastic resin, and optionally various additives using a mixing machine such as a Henschel mixer, or by melt-kneading this mixture under heating conditions using a kneading machine such as a single-screw extruder, a twin-screw extruder, a kneader, a Banbury mixer or a roll. Alternatively, the resin composition may be prepared by dissolving the resin modifier including the diene rubber (A), the thermoplastic resin, and optionally various additives into a solvent capable of dissolving these materials, and thereafter removing the solvent.

The resin composition is useful in various applications such as, for example, pressure-sensitive adhesives, adhesives and vibration damping materials.

EXAMPLES

The present invention will be described in greater detail based on Examples hereinbelow. However, it should be construed that the scope of the present invention is not limited to such Examples.

The following are the components used in Examples and Comparative Examples.

[Diene Rubbers (A)]

Polymers (A-1) to (A-4) obtained in Production Examples 1 to 4 described later

[Solid Rubbers (B)]

Natural rubber (NR) STR20 (from Thailand): manufactured by VON BUNDIT CO., LTD., Tg: −62.6° C.

Butadiene rubber (BR): BR01 (manufactured by JSR Corporation, high-cis type (95% 1,4-cis bonds), weight average molecular weight: 520,000, Tg: −103° C.

[Fillers (C)]

Carbon black: DIABLACK I (N220) (manufactured by Mitsubishi Chemical Corporation, average particle diameter: 20 nm)

Silica: ULTRASIL 7000GR (manufactured by Evonik Degussa Japan, wet silica, average particle diameter: 14 nm)

[Optional Components]

(Silane Coupling Agent)

SI75 (manufactured by Evonik Degussa Japan)

(Vulcanizing Agent)

Sulfur: MUCRON OT-20 (manufactured by SHIKOKU CHEMICALS CORPORATION)

(Vulcanization Aids)

Stearic acid: LUNAC S-20 (manufactured by Kao Corporation)

Zinc oxide: Zinc oxide (manufactured by Sakai Chemical Industry Co., Ltd.)

(Vulcanization Accelerators)

Vulcanization accelerator (1): Sanceler NS (manufactured by SANSHIN CHEMICAL INDUSTRY CO., LTD.)

Vulcanization accelerator (2): Nocceler D (manufactured by Ouchi Shinko Chemical Industrial Co., Ltd.)

(Antioxidants)

Antioxidant (1): Nocrac 6C (manufactured by Ouchi Shinko Chemical Industrial Co., Ltd.)

Antioxidant (2): ANTAGE RD (manufactured by Kawaguchi Chemical Industry Co., LTD.)

(Other Components)

TDAE: VivaTec 500 (manufactured by H&R)

Wax: SUNTIGHT S (manufactured by Seiko Chemical Co., Ltd.)

Properties of diene polymers obtained in Production Examples described later were measured and calculated by the following methods.

(Weight Average Molecular Weight, Number Average Molecular Weight and Molecular Weight Distribution)

Measurement was performed using "HLC-8320" manufactured by TOSOH CORPORATION. The concentration was sample/tetrahydrofuran=5 mg/10 mL. As the developing solution, tetrahydrofuran manufactured by Wako Pure Chemical Industries, Ltd. was used.

The weight average molecular weight (Mw) and the number average molecular weight (Mn) were determined by GPC (gel permeation chromatography) relative to standard polystyrenes, and the molecular weight distribution (Mw/Mn) was calculated from these values. The measurement apparatus and conditions were as follows.

[Measurement Apparatus and Measurement Conditions]
   Apparatus: GPC apparatus "HLC-8320" manufactured by TOSOH CORPORATION
   Separation column: Column "TSKgel Super HZM-M" manufactured by TOSOH CORPORATION
   Eluent: Tetrahydrofuran
   Eluent flow rate: 0.7 ml/min
   Sample concentration: 5 mg/10 ml
   Column temperature: 40° C.

(Glass Transition Temperature (Tg))

10 mg of a sample was placed into an aluminum open pan, which was then closed with an aluminum lid and was crimped with a sample sealer. A thermogram was measured by differential scanning calorimetry (DSC) at a heat-up rate of 10° C./min, and the value at the peak top of DSC was taken as the glass transition temperature (Tg). The measurement apparatus and conditions were as follows.

[Measurement Apparatus and Measurement Conditions]
   Apparatus: Differential scanning calorimeter "DSC6200" manufactured by Seiko Instruments Inc.
   Cooling device: Cooling controller manufactured by Seiko Instruments Inc.
   Detection unit: Heat flux type
   Sample weight: 10 mg
   Heat-up rate: 10° C./min
   Cooling conditions: The temperature was lowered at 10° C./min, held constant at −130° C. for 3 minutes, and then increased.
   Reference container: Aluminum
   Reference weight: 0 mg ($\beta_{12}$ and $\beta_{cp}$)

A solution of 50 mg of a diene polymer obtained in Production Example in 1 ml of deuterated chloroform (CDCl$_3$) was analyzed with $^1$H-NMR at 400 MHz. The total number of scans was 512. Based on the integrals of the portions described below of the chart obtained by the measurement, $\beta_{12}$ (the mol % of 1,2-bonded butadiene units) and $\beta_{cp}$ (the mol % of structural units represented by the formula (1)) were determined in the following manner.

4.65-5.22 ppm portion: Portion A (a synthetic spectrum assigned to 1,2-bonds and structural units represented by the formula (1))

5.22-5.68 ppm portion: Portion B (a synthetic spectrum of 1,2-bonds and 1,4-bonds)

5.68-5.95 ppm portion: Portion C (a spectrum assigned to structural units represented by the formula (1))

$$\beta_{12}=[(\text{integral of portion }A-\text{integral of portion }B\times 2)/2]/[(\text{integral of portion }A-\text{integral of portion }C\times 2)/2+[\text{integral of portion }C-(\text{integral of portion }A-\text{integral of portion }C\times 2)/2]/2+\text{integral of portion }C]\times 100$$

$$\beta_{cp}=\text{integral of portion }C/\{(\text{integral of portion }A-\text{integral of portion }C\times 2)/2+[\text{integral of portion }C-(\text{integral of portion }A-\text{integral of portion }C\times 2)/2]/2+\text{integral of portion }C\}\times 100$$

(Production of Diene Polymers (A))

Production Example 1: Diene Polymer (A-1)

A pressure-resistant container that had been purged with nitrogen and dried was charged with 1320 g of cyclohexane as a solvent and 66.4 g of n-butyllithium (a 1.6 mol/L hexane solution) as a polymerization initiator. The temperature was raised to 50° C. Thereafter, 4.3 g of N,N,N',N'-tetramethylethylenediamine (TMEDA) was added (0.2 mol per mol of the polymerization initiator), and further a mixed solution containing 1320 g of butadiene that had been prepared beforehand was added at 12.5 ml/min (rate of feeding of butadiene per mol of the polymerization initiator: 0.9 mol/min). The polymerization was performed for 1 hour. To the polymerization reaction solution obtained, 7.1 g of methanol was added to terminate the polymerization. The polymerization reaction solution was washed with 2 L of water. After washing, the polymerization reaction solution was separated from water and was dried under reduced pressure at 70° C. for 12 hours to give a polymer (A-1). Properties of the polymer obtained are described in Table 1.

Production Example 2: Diene Polymer (A-2)

A pressure-resistant container that had been purged with nitrogen and dried was charged with 1380 g of cyclohexane as a solvent and 109.2 g of n-butyllithium (a 1.6 mol/L hexane solution) as a polymerization initiator. The temperature was raised to 50° C. Thereafter, 13.2 g of tetrahydrofuran (THF) was added (0.7 mol per mol of the polymerization initiator), and further a mixed solution containing 1000 g of butadiene that had been prepared beforehand was added at 12.5 ml/min (rate of feeding of butadiene per mol of the polymerization initiator: 0.5 mol/min). The polymerization was performed for 1 hour. To the polymerization reaction solution obtained, 10.6 g of methanol was added to terminate the polymerization. The polymerization reaction solution was washed with 2 L of water. After washing, the polymerization reaction solution was separated from water and was dried under reduced pressure at 70° C. for 12 hours to give a polymer (A-2). Properties of the polymer obtained are described in Table 1.

Production Example 3: Diene Polymer (A-3)

A pressure-resistant container that had been purged with nitrogen and dried was charged with 1500 g of cyclohexane as a solvent and 152.9 g of n-butyllithium (a 1.6 mol/L hexane solution) as a polymerization initiator. The temperature was raised to 50° C. Thereafter, 9.29 g of TMEDA was added (0.2 mol per mol of the polymerization initiator), and further a mixed solution containing 1000 g of butadiene that had been prepared beforehand was added at 12.5 ml/min (rate of feeding of butadiene per mol of the polymerization initiator: 0.4 mol/min). The polymerization was performed for 1 hour. To the polymerization reaction solution obtained, 14.8 g of methanol was added to terminate the polymerization. The polymerization reaction solution was washed with 2 L of water. After washing, the polymerization reaction solution was separated from water and was dried under reduced pressure at 70° C. for 12 hours to give a polymer (A-3). Properties of the polymer obtained are described in Table 1.

Production Example 4: Diene Polymer (A-4)

A pressure-resistant container that had been purged with nitrogen and dried was charged with 1184 g of hexane as a solvent and 45.2 g of n-butyllithium (a 1.6 mol/L hexane solution) as a polymerization initiator. The temperature was raised to 40° C. Thereafter, 13.2 g of TMEDA was added (1 mol per mol of the polymerization initiator), and further a mixed solution containing 1184 g of butadiene that had been prepared beforehand was added at 10 ml/min (rate of feeding of butadiene per mol of the polymerization initiator: 1 mol/min). The polymerization was performed for 1 hour. To the polymerization reaction solution obtained, 4.8 g of methanol was added to terminate the polymerization. The polymerization reaction solution was washed with 2 L of water. After washing, the polymerization reaction solution was separated from water and was dried under reduced pressure at 70° C. for 12 hours to give a polymer (A-4). Properties of the polymer obtained are described in Table 1.

Production Example 5: Diene Polymer (A'-5)

A pressure-resistant container that had been purged with nitrogen and dried was charged with 1184 g of hexane as a solvent and 45.2 g of n-butyllithium (a 1.6 mol/L hexane solution) as a polymerization initiator. The temperature was raised to 40° C. Thereafter, 13.2 g of TMEDA was added (1 mol per mol of the polymerization initiator), and further a mixed solution containing 1184 g of butadiene that had been prepared beforehand was added at 5 ml/min (rate of feeding of butadiene per mol of the polymerization initiator: 0.5 mol/min). The polymerization was performed for 1 hour. To the polymerization reaction solution obtained, 4.8 g of methanol was added to terminate the polymerization. The polymerization reaction solution was washed with 2 L of water. After washing, the polymerization reaction solution was separated from water and was dried under reduced pressure at 70° C. for 12 hours to give a polymer (A'-5). Properties of the polymer obtained are described in Table 1.

Production Example 6: Diene Polymer (A'-6)

A pressure-resistant container that had been purged with nitrogen and dried was charged with 1000 g of hexane as a solvent and 28.3 g of n-butyllithium (a 1.6 mol/L hexane solution) as a polymerization initiator. The temperature was raised to 50° C. Thereafter, a mixed solution containing 1000 g of butadiene that had been prepared beforehand was added at 12.5 ml/min (rate of feeding of butadiene per mol of the polymerization initiator: 2 mol/min). The polymerization was performed for 1 hour. To the polymerization reaction solution obtained, 2.7 g of methanol was added to terminate the polymerization. The polymerization reaction solution was washed with 2 L of water. After washing, the polymerization reaction solution was separated from water and was dried under reduced pressure at 70° C. for 12 hours to give a polymer (A'-6). Properties of the polymer obtained are described in Table 1.

TABLE 1

| | Production Examples | | | | | |
|---|---|---|---|---|---|---|
| | 1<br>A-1 | 2<br>A-2 | 3<br>A-3 | 4<br>A-4 | 5<br>A'-5 | 6<br>A'-6 |
| Weight average molecular weight (Mw) | 16,000 | 7,000 | 5,000 | 19,000 | 19,000 | 27,000 |
| Molecular weight distribution (Mw/Mn) | 1.02 | 1.03 | 1.04 | 1.03 | 1.05 | 1.03 |
| Tg (° C.) | −41 | −66 | −49 | −18 | −11 | −94 |
| $\beta_{12}$ (1,2-bonds) mol % | 63.2 | 45.9 | 55.4 | 53.0 | 46.0 | 9.0 |
| $\beta_{cp}$ mol % | 3.7 | 1.2 | 9.6 | 23 | 30 | 0 |
| $\beta_{cp}/(\beta_{12} - 40)$ | 0.16 | 0.20 | 0.62 | 1.8 | 5.0 | — |
| Monomer feed rate ml/min | 12.5 | 12.5 | 12.5 | 10 | 5 | 12.5 |
| Butadiene feed rate (mol/min) per mol of polymerization initiator | 0.9 | 0.5 | 0.4 | 1 | 0.5 | 2 |
| Initiator | NBL | NBL | NBL | NBL | NBL | NBL |
| Number of moles of initiator | 0.17 | 0.28 | 0.39 | 0.11 | 0.11 | 0.07 |
| Polar compound | TMEDA | THF | TMEDA | TMEDA | TMEDA | — |
| Grams of polar compound | 4.3 | 13.2 | 9.29 | 13.2 | 13.2 | 0 |
| Number of moles of polar compound | 0.037 | 0.183 | 0.080 | 0.114 | 0.114 | 0 |
| Number of moles of polar compound per mol of polymerization initiator | 0.2 | 0.7 | 0.2 | 1 | 1 | 0 |

Initiator NBL: n-butyllithium

Examples 1 to 4 and Comparative Examples 1 to 3

The polymer (A), the solid rubbers (B), the fillers (C), the vulcanization aids, the silane coupling agent, the antioxidants and other components were added in the amounts (parts by mass) described in Table 2 into an internal Banbury mixer and were kneaded together for 6 minutes from a start temperature of 60° C. to a resin temperature of 140° C. Thereafter, the kneaded mixture was removed from the mixer and was cooled to room temperature. Next, the mixture was placed into the internal Banbury mixer again, and the vulcanizing agent and the vulcanization accelerators were added. The resultant mixture was kneaded for 75 seconds from a start temperature of 50° C. to a maximum temperature of 100° C. Rubber compositions were thus obtained.

The rubber compositions obtained were each subjected to press forming (pressing conditions: 145° C., 70 to 75 minutes) to give a crosslinked sheet (2 mm in thickness) of the crosslinked product (the vulcanized rubber). The sheets were tested by the methods described below to determine the storage modulus and Tan δ. The results are described in Table 2.

(Ice Grip Performance)

The crosslinked sheets produced in Examples and Comparative Examples were cut to give test pieces 40 mm in length and 5 mm in width. The test pieces were tested with a dynamic viscoelastometer manufactured by GABO GmbH at a measurement temperature of −20° C., a frequency of 10 Hz, a static strain of 10% and a dynamic strain of 2% to determine the storage modulus (E') and tan δ as indexes of the ice grip performance. The results are described in Table 2 as absolute values and as values relative to the value of Comparative Example 3 taken as 100. The ice grip performance of the rubber composition is higher with decreasing absolute value and increasing relative value of storage modulus (E'). The ice grip performance of the rubber composition is higher with increasing absolute value and increasing relative value of Tan δ.

The relative values of storage modulus (E') as an index of the ice grip performance were calculated using the following equation:

Relative value of storage modulus (E') of Example or Comparative Example=(absolute value of storage modulus (E') of Comparative Example 3, 8.63 MPa)/(absolute value of storage modulus (E') of Example or Comparative Example)×100 determine Tan δ as an index of the wet grip performance. The results are described in Table 2 as absolute values and as values relative to the value of Comparative Example 3 taken as 100. The larger the value, the higher the wet grip performance of the rubber composition.

The relative values of Tan δ (0° C.) as an index of the wet grip performance were calculated using the following equation:

Relative value of Tan δ (0° C.) as index of wet grip performance of Example or Comparative Example=(absolute value of Tan δ (0° C.) of Example or Comparative Example)/(absolute value of Tan δ (0° C.) of Comparative Example 3, 0.31)×100

TABLE 2

|  |  |  | Examples |  |  |  | Comparative Examples |  |  |
|---|---|---|---|---|---|---|---|---|---|
|  |  |  | 1 | 2 | 3 | 4 | 1 | 2 | 3 |
| Formulation (parts by mass) | Components (A) | Polymer (A-1) | 10 |  |  |  |  |  |  |
|  |  | Polymer (A-2) |  | 10 |  |  |  |  |  |
|  |  | Polymer (A-3) |  |  | 10 |  |  |  |  |
|  |  | Polymer (A-4) |  |  |  | 10 |  |  |  |
|  |  | Polymer (A'-5) |  |  |  |  | 10 |  |  |
|  |  | Polymer (A'-6) |  |  |  |  |  | 10 |  |
|  | Components (B) | NR | 70 | 70 | 70 | 70 | 70 | 70 | 70 |
|  |  | BR | 30 | 30 | 30 | 30 | 30 | 30 | 30 |
|  | Components (C) | Silica | 35 | 35 | 35 | 35 | 35 | 35 | 35 |
|  |  | Carbon black | 35 | 35 | 35 | 35 | 35 | 35 | 35 |
|  | Optional components | Silane coupling agent | 2.8 | 2.8 | 2.8 | 2.8 | 2.8 | 2.8 | 2.8 |
|  |  | Sulfur | 1.9 | 1.9 | 1.9 | 1.9 | 1.9 | 1.9 | 1.9 |
|  |  | Zinc oxide | 3.5 | 3.5 | 3.5 | 3.5 | 3.5 | 3.5 | 3.5 |
|  |  | Stearic acid | 2 | 2 | 2 | 2 | 2 | 2 | 2 |
|  |  | Vulcanization accelerator (1) | 1 | 1 | 1 | 1 | 1 | 1 | 1 |
|  |  | Vulcanization accelerator (2) | 0.5 | 0.5 | 0.5 | 0.5 | 0.5 | 0.5 | 0.5 |
|  |  | Antioxidant (1) | 1.5 | 1.5 | 1.5 | 1.5 | 1.5 | 1.5 | 1.5 |
|  |  | Antioxidant (2) | 1 | 1 | 1 | 1 | 1 | 1 | 1 |
|  |  | Wax | 1.5 | 1.5 | 1.5 | 1.5 | 1.5 | 1.5 | 1.5 |
|  |  | TDAE | 10 | 10 | 10 | 10 | 10 | 10 | 20 |
| Properties | Ice grip performance Storage modulus (−20° C.) | MPa | 8.84 | 8.09 | 8.49 | 9.29 | 9.64 | 8.56 | 8.63 |
|  |  | Relative value | 98 | 107 | 102 | 93 | 90 | 101 | 100 |
|  | Ice grip performance Tanδ (−20° C.) | — | 0.44 | 0.45 | 0.47 | 0.46 | 0.46 | 0.43 | 0.44 |
|  |  | Relative value | 100 | 102 | 107 | 105 | 105 | 98 | 100 |
|  | Wet grip performance Tanδ (0° C.) | — | 0.33 | 0.32 | 0.32 | 0.33 | 0.34 | 0.32 | 0.31 |
|  |  | Relative value | 106 | 103 | 103 | 106 | 110 | 103 | 100 |
|  | Total of relative values of ice grip performance (storage modulus, Tanδ) and wet grip performance (Tanδ) | Total of relative values | 305 | 312 | 312 | 304 | 304 | 302 | 300 |

NR: natural rubber,
BR: butadiene rubber

The relative values of Tan δ (−20° C.) as an index of the ice grip performance were calculated using the following equation:

Relative value of Tan δ (−20° C.) of Example or Comparative Example=(absolute value of Tan δ (−20° C.) of Example or Comparative Example)/(absolute value of Tan δ (−20° C.) of Comparative Example 3, 0.44)×100

(Wet Grip Performance)

The crosslinked sheets produced in Examples and Comparative Examples were cut to give test pieces 40 mm in length and 5 mm in width. The test pieces were tested with a dynamic viscoelastometer manufactured by GABO GmbH at a measurement temperature of 0° C., a frequency of 10 Hz, a static strain of 10% and a dynamic strain of 2% to From Table 2, the crosslinked products obtained from the rubber compositions of Examples 1 to 3 attained enhancements in ice grip performance and wet grip performance in a well-balanced manner as compared with the crosslinked products of Comparative Examples 1 to 3. Example 4 achieved high ice grip performance as compared with Comparative Example 1, and thus resulted in a well-balanced enhancement in the total of ice grip performance and wet grip performance. Because $β_{cp}$ was too high, Comparative Example 1 resulted in an excessively high storage modulus (−20° C.) was thus low ice grip performance, although Tan δ (−20° C.) and Tan δ (0° C.) were good. Comparative Example 2 failed to attain sufficient enhancements in Tan δ (−20° C.) and Tan δ (0° C.) because of too low $β_{12}$ and $β_{cp}$.

Thus, the rubber compositions of Examples 1 to 4 satisfying $\beta_{cp}/(\beta_{12}-40) \leq 2$ were shown to have well-balanced ice grip performance and wet grip performance.

INDUSTRIAL APPLICABILITY

The diene rubber (A) of the present invention exhibits excellent processability when formed into a rubber composition. Further, when the rubber is formed into a crosslinkable rubber composition by being combined with a crosslinking agent (a vulcanizing agent) or the like, the rubber composition or a crosslinked product thereof attains high levels of wet grip performance and ice grip performance at the same time, and also exhibits excellent mechanical properties, thus being useful in tire applications or the like.

The invention claimed is:

1. A diene rubber, comprising:
butadiene units,
wherein the diene rubber has a weight average molecular weight in a range of from 5,000 to 19,000,
the diene rubber satisfies (i) to (iii)

$$\beta_{cp} > 0 \qquad (i),$$

$$\beta_{12} > 40 \qquad (ii), \text{ and}$$

$$\beta_{cp}/(\beta_{12}-40) \leq 2 \qquad (iii), \text{ and}$$

with respect to all the butadiene units present in the diene rubber, $\beta_{12}$ is mol % of 1,2-bonded butadiene units, and $\beta_{cp}$ is mol % of structural units of formula (1)

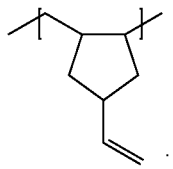

(1)

2. A rubber composition, comprising:
the diene rubber of claim 1.
3. The rubber composition of claim 2, further comprising: a solid rubber.
4. The rubber composition of claim 2, further comprising: a filler.
5. A crosslinked product, obtained by crosslinking the rubber composition of claim 2.
6. A tire tread, comprising:
the rubber composition of claim 2 or a crosslinked product obtained by crosslinking the rubber composition.
7. A bead filler, comprising:
the rubber composition of claim 2 or a crosslinked product obtained by crosslinking the rubber composition.
8. A tire belt, comprising:
the rubber composition of claim 2 or a crosslinked product obtained by crosslinking the rubber composition.
9. A pneumatic tire, comprising:
the rubber composition of claim 2 or a crosslinked product obtained by crosslinking the rubber composition.
10. The pneumatic tire of claim 9, which is a winter tire or a studless tire.
11. The pneumatic tire of claim 9, which is an all-season tire.
12. A resin modifier, comprising:
the diene rubber of claim 1.
13. The diene rubber of claim 1, comprising, based on a total diene rubber monomer mass, no more than 50 mass % of additional monomer units other than the butadiene units in the diene rubber.
14. The diene rubber of claim 1, further comprising:
no more than 40 mass % of additional monomer units other than the butadiene units with respect to a total monomer mass of the diene rubber.
15. The diene rubber of claim 1, wherein $\beta_{cp} \geq 0.8$.
16. The diene rubber of claim 1, wherein $\beta_{cp} \leq 30$.
17. The diene rubber of claim 1, wherein $\beta_{12} \leq 80$.
18. A rubber composition, comprising:
a diene rubber comprising butadiene units and having a weight average molecular weight in a range of 5,000 to 19,000;
a solid rubber comprising at least one selected from the group consisting of a natural rubber, a styrene butadiene rubber, a butadiene rubbers, and an isoprene rubber;
a filler comprising silica; and
a vulcanizing agent comprising at least one selected from the group consisting of sulfur and a sulfur compound,
wherein the diene rubber satisfies (i) to (iii)

$$\beta_{cp} > 0 \qquad (i),$$

$$\beta_{12} > 40 \qquad (ii), \text{ and}$$

$$\beta_{cp}/(\beta_{12}-40) \leq 2 \qquad (iii), \text{ and}$$

with respect to all the butadiene units present in the diene rubber, $\beta_{12}$ is mol % of 1,2-bonded butadiene units, and $\beta_{cp}$ is mol % of structural units of formula (1)

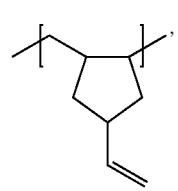

(1)

a content of the diene rubber is from 2 to 30 parts by mass, per 100 parts by mass of the solid rubber,
a content of the silica is from 20 parts by mass to 100 parts by mass, per 100 parts by mass of the solid rubber, and
a content of the vulcanizing agent is from 0.1 parts by mass to 10 parts by mass, per 100 parts by mass of the solid rubber.
19. The rubber composition of claim 18, wherein the content of the diene rubber is from 2 parts by mass to 20 parts by mass, per 100 parts by mass of the solid rubber.
20. The rubber composition of claim 18, wherein the filler further comprises carbon black, and a content of the carbon black is from 10 parts by mass to 120 parts by mass, per 100 parts by mass of the solid rubber.

* * * * *